United States Patent [19]

Paturel et al.

[11] Patent Number: 4,912,474

[45] Date of Patent: Mar. 27, 1990

[54] RADAR APPARATUS FOR REALIZING A RADIO MAP OF A SITE

[75] Inventors: Serge Paturel, Orsay; Roland Allezard, Verrieres Le Buisson, both of France

[73] Assignee: U.S. Philips Corporation, New York, N.Y.

[21] Appl. No.: 271,558

[22] Filed: Nov. 15, 1988

[30] Foreign Application Priority Data

Nov. 24, 1987 [FR] France ................. 87 16251

[51] Int. Cl.⁴ ............................................. G01S 13/90
[52] U.S. Cl. ............................................. 342/191
[58] Field of Search ............... 342/122, 128, 133, 191, 342/196

[56] References Cited

U.S. PATENT DOCUMENTS

| | | | |
|---|---|---|---|
| 4,355,311 | 10/1982 | Jain | 342/128 |
| 4,562,439 | 12/1985 | Peralta et al. | 342/128 |
| 4,568,938 | 2/1986 | Ubriaco | 342/122 |
| 4,620,192 | 10/1986 | Collins | 342/128 |
| 4,633,253 | 12/1986 | Stove et al. | 342/122 |
| 4,766,436 | 8/1988 | Crepin et al. | 342/122 |

FOREIGN PATENT DOCUMENTS 3246084  6/1984  Fed. Rep. of Germany .

Primary Examiner—Thomas H. Tarcza
Assistant Examiner—Mark Hellner
Attorney, Agent, or Firm—Robert J. Kraus

[57] ABSTRACT

The sensor (1), of the FM-CW type, comprises a transceiver aerial (2) which is rigidly attached to the support of the sensor and is of the frequency scanned beam steering type. The sensor radiates a frequency F of several GHz according to a sawtooth pattern which is nearly linear, generates a beat signal ($F_b$) between a transmitted wave and a received wave an comprises an analog processing circuit (17) for the signal $F_b$, digitizing means for $F_b$ (22), memories for time-division samples (28) and frequency-division samples (33), and digital processing means (31) transforming sequences (SU) of time-division samples into sequences (SV) of frequency-division samples. The order number of each sequence is representative of a strip of pixels of the map and the order number of a sample in a sequence is representative of a distance of a pixel on the map.

9 Claims, 4 Drawing Sheets

RADAR APPARATUS FOR REALIZING A RADIO MAP OF A SITE

BACKGROUND OF THE INVENTION

The invention relates to a radio sensor comprising a support and a transceiver aerial, for realising with polar co-ordinates a radio map of a site, after a detection of a duration TM.

The invention can be used for civil as well as military purposes. When attached to an aircraft, such a radio sensor can be used at low altitude for forming a picture of the nearby landscape situated ahead of the aircraft. The same sensor, when installed on the roof of a factory, can also perform a monitoring function by forming radio picture(s) of the factory surroundings.

The type of radio map considered in this context is known in the English language by the name of PPI for "Plan Position Indicator". Devices of the type mentioned in the opening paragraph are known with which radio maps of the ground can be realised, such as for example, the radar called "Antilope" used on the French "Mirage 2000" fighters, and manufactured by the companies of ELECTRONIQUE SERGE DASSAULT and THOMSON-CSF. These known devices are pulse radars comprising a mobile aerial for realising the sector scanning necessary for establishing the map with polar co-ordinates. In this case a transceiver aerial is concerned whose support is constituted by a stabilized platform. To compensate for the stray pitching, rolling and twisting motion of the aircraft, the position of the stabilized platform is controlled such that this platform permanently rests in parallel with itself, in a predetermined direction. The disadvantages of this prior art device are its complexity, its fragility and its high cost, basically due to the two combined relative movements of the aerial.

SUMMARY OF THE INVENTION

It is an object of the present invention to realise a radio sensor for estalbishing a radio map, which utilizes a fixed aerial.

It is another object of the invention to realise a radio sensor for establishing a radio map, which connects to a fixed aerial a radar of the linearly frequency-modulated continuous wave type (FM-CW).

It is yet another object of the invention to realise a radio sensor for establishing a radio map, which can be removed from a stabilized platform when it is fixed to a mobile craft.

These objects are achieved and the prior art disadvantages diminished or disposed of because the radio sensor defined in the opening paragraph is characterized in that the aerial is rigidly attached to the support of the sensor, which is of the frequency scanned beam steering type having a scan angle of $\alpha_d$ of a radiation pencil beam caused by the transmitted frequency swing F. The sensor, which operates at a frequency between 1 and 100 GHz, is of the frequency-modulated continuous wave type and thereto comprises a voltage slope generator which controls a very-high frequency F signal-generator, nearly linearly frequency modulated according to a sawtooth pattern, for the period TM, depending on a frequency swing $\Delta F$, TM and $\Delta F$ being fixed and predetermined, means for realising the beat between the transmitted wave and the wave received as an echo signal for generating a subtractive beat signal $F_b$ having frequency $f_b$. The sensor further comprises, downstream of the means for realising the beat:

an analog signal processing circuit comprising amplifying and filter means for the signal $F_b$, digitizing means at least for the amplified and filtered signal $F_b$, a memory for time-division samples which comprises at least the g samples of the signal $F_b$ tapped during period TM or the multiples thereof (several times TM), a memory for frequency-division samples of the radio map and digital processing means performing at least one time-division/frequency-division transformation of the successive time-division sample sequences SU, tapped with a slight shift delay with respect to the period TM in the memory for time-division samples, the sequences SU, being p in number, comprising a number of n samples and supplying to the memory for frequency-division samples sequences SV of frequency-division samples, on the basis of one sequence SV for each sequence SU, the amplitude of each frequency-division sample being representative of one pixel of the site and its address being representative of the polar co-ordinates of this pixel of the site, so that each sequence SV constitutes at least partly a radial position of the map.

The basic idea of the invention is to use a FM-CW radar transmitting a frequency saw-tooth for example having a negative slope exhibiting fixed high values with respect to duration and frequency swing, equal to: TM=40 ms and $\Delta F$ =300 MHz respectively. At each specific value $f_c$ of the transmitted frequency, a value $\alpha_{dc}$ corresponding to a scan angle $\alpha_d$ of the axis of the radiation pencil beam transmitted by the aerial, corresponds biuniquely and linearly to F and a small range $\Delta f_c$ around the value $f_c$ is considered for which the scan angle differs from a value $\Delta\alpha_{dc}$ during a period $\Delta$TM. For this range one chooses an angular value for a strip on the radio map to be established, which is either of the same order as the horizontal width $\theta_d$ of the radiation pencil beam, or around 1° or 2°. The beat signal $F_b$ having the intermediate frequency $f_b$ during the period $\Delta$TM is sampled so as to form a sequence of time-division samples and then, by a time-division/frequency-division transformation for example by means of a Fast Fourier Transform (FFT), converted into frequency-division samples which, as will presently be explained, are representative of the elementary pixels or surfaces located on the considered strip to be established, by the amplitude-distance coupling which characterizes them. When taking thus various ranges of the signal $F_b$ which correspond to as many ranges $\Delta f_c$ comprised in the frequency swing $\Delta F$ of the sawtooth of the transmitted signal, as well as the associated mean value $\alpha_d$ of the scan angle, it is possible to establish the wanted radio map. The main features of the described sensor are the following: its operation is based on a radio picture of the PPI type of the ground at the observation frequency, typically centred at 15 GHz and at the observation incidence, the site angle $\theta_s$ of the transmitted radiation pencil beam being on the order of 20 to 30 degrees below the horizontal. For this 15 GHz frequency and at the grazing incidence, the backscatter coefficient is still approximately 10 dB different for concrete and grass. As already indicated hereinbefore, the picture forming technique uses an aerial that requires neither mechanical scanning nor even stabilization along two or three axes if one wishes to suppress this stabilization too. This results in the following advantages: an important simplification in a realisation of the sensor, a large robustness and diminished maintainance during the useful life of the sensor, these advantages being linked with the partial or total suppression of the complex mechanical movements which are usually imposed on the aerial.

The sensor can be attached to the ground or to a fixed structure; it can also be mounted on a vehicle such as a vessel, a land-based vehicle or an aircraft. When the carrying craft is in operation it is moved around its centre of gravity; these movements are generally slow if compared to the detection and calculation speed of the radio sensor. However, when an aircraft is concerned, these movements can be so fast as to deform the radio map by several percent, concerning the position of the pixels, and require a correction. As will be observed hereinafter, a correction for pitching is never required, which forms an additional advantage of the sensor according to the invention; alternatively, it may prove to be necessary to correct the yawing motion.

A first embodiment of the invention is characterized in that the aircraft carrying the sensor comprises an inertia unit and in that the sensor support is a stabilized platform forming an integral part of the aircraft, whose stabilization is obtained by means of the inertia unit of the aircraft; in this respect a type of correction is concerned of the stray movements of the carrying craft known per se, which is suitable for use in the sensor according to the invention. However, given the simplification linked with a reliability that one wants to introduce for establishing a radio map of a site, it is advantageous that the support itself of the sensor is rigidly attached to the aircraft even when the latter is subjected to rapid pitching and yawing motion.

Consequently, another embodiment of a radio sensor that withstands yawing, mounted on an aircraft comprising an inertia unit is characterized in that the p sequences SU are adjacent and comprise the same number of samples during the period TM so that the equality pn=q is obtained, in that the sequence number i (i varying from 1 to p) of each sequence SU constitutes the address of the strip constituted by the sequence SV derived from each considered sequence SU and in that the digital processing means compute the number n such that the number is proportional to the value $\alpha_{d\text{-}max} - \theta_1$, where $\theta_1$ is the value of the yawing angle computed in an algebraic value during the period TM.

Another embodiment of a radio sensor that withstands yawing, installed on an aircraft comprising an inertia unit is characterized in that the digitizing means sample the signal SG transmitted by the voltage slope generator, whereas the samples of the signal SG are stored in the memory for time-division samples, and in that the processing means compute the beginning of each sequence SU taking a sample value of the signal SG into account and, as the case may be, an associated value of the yawing angle $\theta_1$.

The correction of the stray yawing motion can thus in a simple way be effected in the digital processing part of the sensor.

BRIEF DESCRIPTION OF THE DRAWINGS

With the following description respecting the annexed drawing Figures, all given by way of example, it will be better understood how the invention can be realised, in which.

DESCRIPTION OF THE PREFERRED EMBODIMENTS

Figure 1:
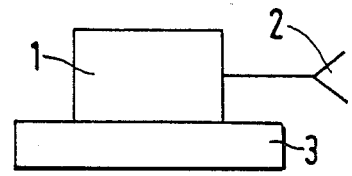
FIG. 1 shows the radio sensor comprising a support and a transceiver aerial.

FIG. 1 shows in a very schematic way a radio sensor 1 having a transceiver aerial 2, both being rigidly attached to a support 3. The support 3 can be permanently installed on the roof of a building (not shown) such as a factory. The support 3 can also be carried by a mobile craft, a ground-based vehicle, a vessel or an aircraft (not shown), in which case the support can be either a platform which is stabilized under the control of an inertia unit of the mobile craft or a gyrostabilized support, or a support which is rigidly attached to the mobile craft.

Figure 2:
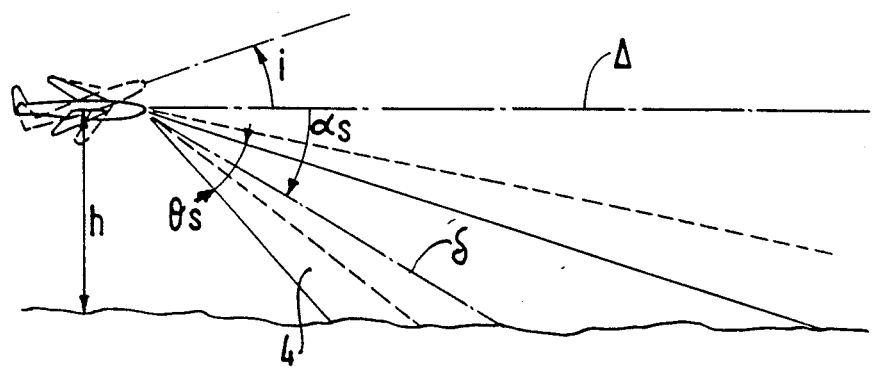
FIG. 2 illustrates the position in the vertical direction of the radiation pencil beam transmitted by the aerial.
Figure 3:
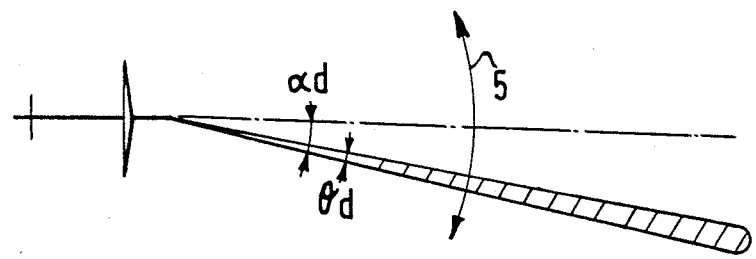
FIG. 3 illustrates the position in the horizontal direction of the radiation pencil beam transmitted by the aerial.
Figure 10:
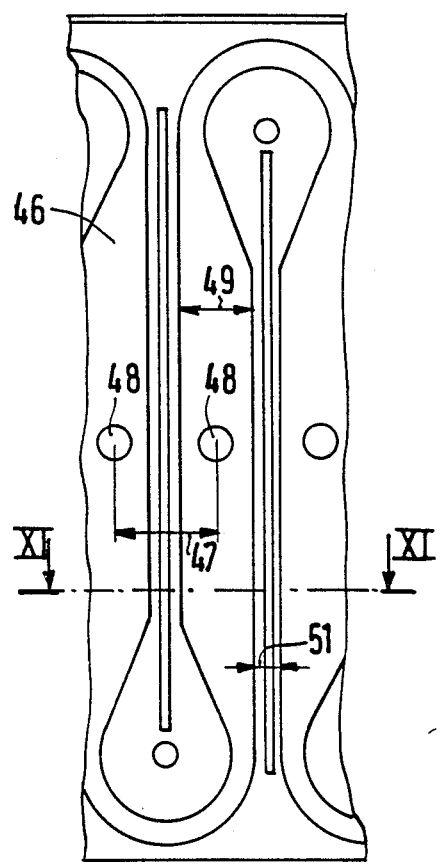
FIG. 10 is a cut-away plan view of the interior of a half of the aerial of FIG. 9.
Figure 11:
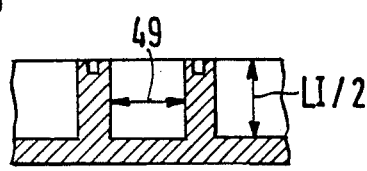
FIG. 11 is a view along the section XI—XI of FIG. 10.

The sensor 1 is intended to form a radio map of the surrounding site. For this purpose, an electro-magnetic radiation pencil beam is transmitted by the transceiver aerial 2. This radiation pencil beam (4, FIG. 2), which has the form of a pencil, has a vertical width $\theta_s$ on the order of 20 to 30 degrees and a horizontal width on the order of 1.5 to 3 degrees. Let $\Delta$ be the longitudinal axis of the sensor which is horizontal when the sensor is in its nominal position and let $\alpha_s$ be the angle formed by the axis $\delta$ of the radiation beam, measured downwards from the axis $\Delta$. Furthermore, the angle of incidence i is formed by a plane passing through axis $\Delta$ and containing the axis X of the carrying craft. This angle i, computed positively or negatively, is only to be taken into account if the sensor 1 is rigidly attached to a vehicle. The value $\alpha_S$ is chosen such that the beam 4 always continues to be directed downwards. If $i_{max}$ is the maximum value of i, the following relation is obtained:

$$\alpha_s > \theta_S/2 + i_{max}$$

for example, for $\theta_S = 20°$, and $i_{max} = 7°$, one chooses $\alpha_s > 17°$. In FIG. 2 is shown in a broken line the orientation of the beam 4 for an angle of incidence i directed upwards. Under these conditions there is always one part of tfhe beam 4 which is bound to be directed to the ground between several tens of meters and several hundreds of meters ahead of the sensor. Furthermore, the beam 4 effects horizontal sector scanning on the order of several tens of degrees on both sides of the Δ axis, the scan angle $\alpha_d$ of the axis δ of the beam being, for example, between +15° and −15°, (or 0° and 30°, or 0 and $\alpha_{dmax}$), as indicated by the double arrow 5 in FIG. 3. In the prior art this pencil beam scanning is achieved by a mechanical movement of the aerial, by means of a motor, which is expensive, causes breakdown risks and requires careful maintenance. According to the invention, the horizontal scanning is achieved by the transmitted frequency swing F. It should be observed that this type of scanning is known per se, specifically from the book entitled "Radar Handbook" by Skolnik, published by MacGraw Hill, chapter 13, but not in its application for establishing a radio map. An example of the aerial to be used for implementing the invention is described hereinbelow with reference to the FIGS. 9, 10 and 11.

The sensor used is described hereinbelow with reference to FIG. 4. The operating principle is that of a linearly frequency-modulated continuous wave or undamped wave radar (FM-CW). The structure of this radar bears a resemblance to that of an FM-CW radio altimeter having two aerials, one for the emission, the other one for the reception like, for example, the radio altimeter described in the French Patent Specification 1 557 670, or having a single transceiver aerial, the latter category of radio altimeters being more compact and more recent.

The basic formulas which characterize the operation of a radio altimeter or of an FM-CW radar, in the case in which the frequency modulation is absolutely proportional to time, are the following:

$$f_b = \tau \frac{\Delta F}{T_e} \quad (1)$$

$$\tau = \frac{2d}{c} \quad (2)$$

wherein:
- $f_b$: is the subtractive beat frequency between the transmitted wave and received wave in the echo signal (from the ground or an object), in the mixer output signal,
- $\tau$: is the delay between the transmitted wave and received wave in the echo signal,
- $\Delta F$: is the frequency swing of the sawtooth of the transmitted signal, maintained at a fixed level,
- $T_e$: is the duration of the sawtooth of the transmitted signal,
- d: is the distance from the ground or an object,
- c: is the propagation velocity of an electro-magnetic wave in the air.

Equivalent equations exist when the frequency modulation is not strictly linear. By way of example only the simple case of linear equations will be described.

For a radio altimeter the beat frequency $f_b$ characteristic of the ground is generally chosen to be maintained at a fixed value $f_{b0}$. The result is that the duration $T_e$ of the sawtooth of the transmitted signal constitutes a measure of the distance d looked for, which can easily be derived from the combination of the formulas (1) and (2) which then provides a proportionality between d and $T_e$. Furthermore, the sawtooth is systematically transmitted in a repetitive way.

Alternatively, in the radar according to the invention, it is the duration $T_e$ which, in addition to the frequency swing $\Delta F$, is maintained at a constant value TM and it is then the beat frequency $f_b$ which constitutes a measure of the distance d according to the formula:

$$f_b = \frac{2 \Delta F}{c T} d \quad (3)$$

Figure 5A:
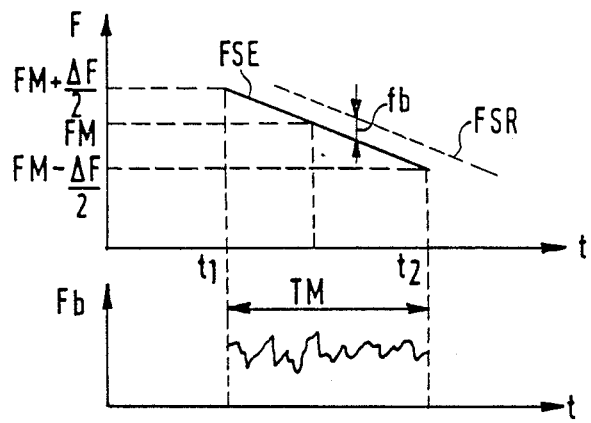
FIG. 5a represents the frequency of the transmitted signal and the received echo signal plotted against time and FIG. 5b the resulting signal $F_b$.
Figure 5B:

In the FIGS. 5a and 5b respectively, plotted against time are the frequency F of the transmitted signal, and the signal $F_b$ which results from the superpositioning of the different simultaneously received echo signals from the ground. In FIG. 5a is shown the instantaneous frequency $f_b$ of the signal $F_b$, which is the constant difference of the ordinates between the frequency of the transmitted signal FSE and the frequency of the returned signal or the echo signal FSR, and it should be observed that the signal FSR and the frequency $f_b$ are fictional, in that they feature a non-existing mean echo signal. This enables a simpler structure of the radar because a control loop comprising a frequency discriminator is no longer required between the mixer and the very-high frequency signal generator. In this case, the information of the distance d can be obtained by means of a frequency spectrum analysis which corresponds better with the use of radar because one obtains a simultaneous message about all the targets present. A disadvantage of this principle is the large pass-band which is necessary for the receiver, when one wishes to perform a detection of the objects in a very large distance aperture. However, for the considered applications which relate to the radar according to the invention, the desired distance apertures cover between several tens and several hundreds of meters, which limits the above-mentioned disadvantage.

Radars are known like those mentioned above, which have the specific feature of being not necessarily periodic, that is to say that the transmission of a sawtooth at a given instant can suffice for a working cycle, for which reason they are qualified as intermittent or interrupted FM-CW radars. The radar which constitutes the essence of the sensor according to the invention can present this particularity and operates at a frequency F comprised between 1 and 100 GHz.

Figure 4:
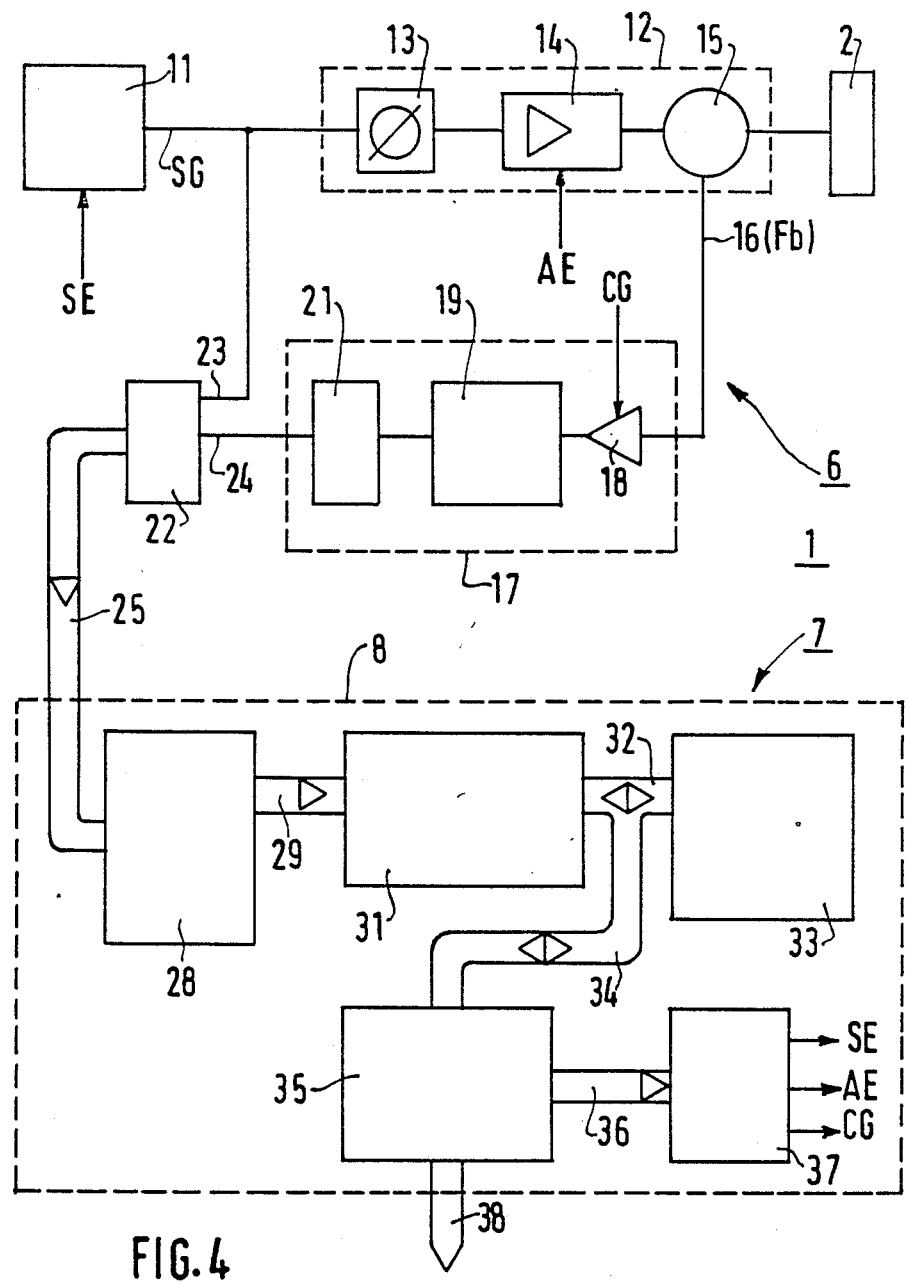
FIG. 4 is a block diagram of the sensor comprising its electronic signal processing box.

The sensor 1 represented in FIG. 4 comprises two main sub-assemblies which are a radar 6 of the type described in the preceding paragraphs, represented at the top of the Figure, and an electronic processor 7 represented in a box of broken lines 8 at the bottom of the Figure.

The radar 6 operates, for example, in the 15 GHz band and comprises the following elements:
a direct voltage circuit constituted by the cascade arrangement, in this order, of a voltage slope generator 11, a very-high frequency stage 12 comprising a voltage-controlled oscillator (VCO) 13, an amplifier 14, a mixer 15, a transceiver aerial 2 and an output 16 of the mixer 15, p an intermediate-frequency correcting and amplifying circuit 17 constituted by an amplifier 18, a first band-pass filter 19 and a second band-pass filter 21,
an analog-digital converter 22, constituting digitizing means which receives on a first input 23 the signal transmitted by the slope generator 11 and on a second input 24 the output signal of filter 21.

In the diagram of FIG. 4, the mean beat values of the transmitted and received waves are realised simply by using the mixer 15 which is a homodyne mixer. In a known fashion, which is not shown, it is also possible to use a circulator or a directional coupler in lieu of the mixer 15, connected to a mixer which receives on a second input, from a coupler, by way of local oscillation, a fraction of the signal transmitted by the VCO 13, whereas the output of this mixer is connected to the conductor 16 of FIG. 4.

The generator 11, which drives the VCO 13, is actuated by a transmission signal SE emanating from the electronic processor 7. The power transmission from the very-high frequency stage 12 is approximately 1.5 W at the useful frequency. The very-high frequency stage receives, on a separate input of the amplifier 14, a control signal to stop the transmission of AE originating from the electronic processor 7. The aerial 2 transmits a radiation pencil beam as already described hereinbefore, with a frequency swing ΔF on the order of 300 MHz, on both sides of a central frequency FM equal to 15.2 GHz.

The output 16 of mixer 15 is the origin of a subtractive beat signal $F_b$. This signal $F_b$ is applied to the amplifier 18 whose gain is controlled by a control signal CG emanating from the electronic processor 7, in order to better adapt the level of the signal to the encoding dynamics described hereinafter. The band-pass filter 19 selects the frequency range which corresponds with the anticipated observation distances varying from $d_{mini}$, of the order of several tens of meters to $d_{maxi}$, on the order of several hundreds of meters; at high frequencies it plays the part of an anti-folding filter for the sampling operation which is to follow. The band-pass filter 21 has for its object to partly compensate for the $1/d^3$ law of the radar echo level versus the distance; by progressively raising the level of the signals to the high frequencies, it is instrumental in giving to all the echo signals situated in the distance-range varying from $d_{mini}$ to $d_{maxi}$ the same range of amplitude variation and thus the same coding resolution.

A signal representing the transmitted frequency carried by a conductor 23 and a signal representing the echo signals carried by a conductor 24 are transmitted in a digital form by the converter 22 to the electronic processor 7 via a bus 25. For this purpose, the converter 22 comprises a sampler which samples, for example at the 250 kHz frequency, the above signals received in analog form on the conductors 23 and 24. The transmission sawtooth of the duration TM is fixed, for example TM=40 msec and the frequency thereof swings between two fixed predetermined thresholds. In the chosen digital example, the number of samples of the filtered and digitized beat signal is, for a given sawtooth, equal to 4000. It will now be examined, with reference to FIG. 6, what happens locally during an interval ΔTM in the period TM, during which the transmitted signal develops around a frequency $F_c$ situated between $F_M+\Delta F/2$ and $F_M-\Delta F/2$, in the band:

$$F_c - \frac{\Delta F_c}{2}, F_c + \frac{\Delta F_c}{2}.$$

Figure 6:
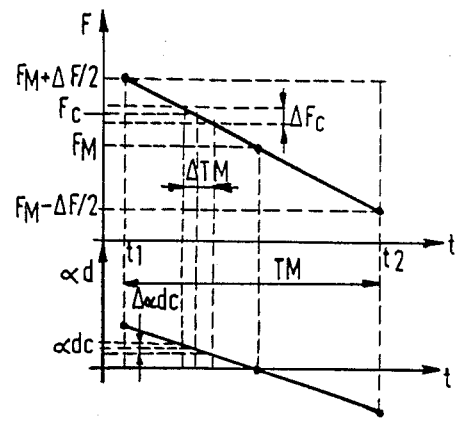
FIG. 6 is a time diagram showing the compared variations of the elevation angle of the radiation pencil beam and of the frequency of the transmitted signal.

It should be observed that at the top of FIG. 6 a sawtooth is represented of the transmitted signal having a negative slope; sawtooth frequencies having a positive slope could also be used.

Figure 7:
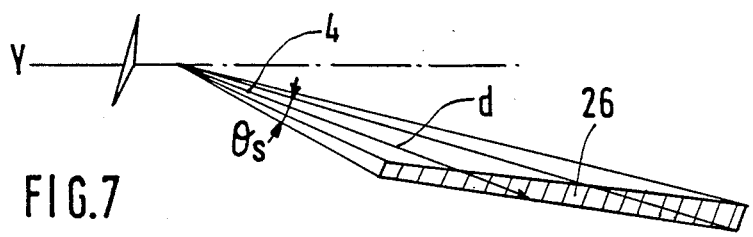
FIG. 7 illustrates in perspective a strip of the radio map to be established.

The radar beam 4 has an elevation orientation $\alpha_d$ which varies by $\Delta\alpha_{dc}$ around the value $\alpha_{dc}$. The angular variation $\Delta\alpha_{dc}$ is of the same order as the horizontal width $\theta_d$, that is to say, one to several degrees. A sequence of N samples of the beat signal $F_b$ amplified and filtered as described above is associated to these variations of analog magnitudes on bus 25. If a spectral analysis method is employed for these N samples, for example a Fourier transform, a time-division/frequency-division transformation will be obtained, whereas the set of considered frequencies are the frequencies $f_b$ representing echo signals from the ground during the period ΔTM, which frequencies are themselves representative of the distance d of the echo signals as represented in FIG. 7. To each period ΔTM can then be associated a narrow strip of the terrain situated radially ahead of the sensor and which can in a first approximation be compared to a sector of the landscape analysed in polar co-ordinates. A representative associated sample of the angle $\alpha_{dc}$ can be made to correspond to this sector by means of the conductor 23 and the converter 22 on bus 25. It should be observed that when proceeding in the above-described fashion one will not obtain an accurate map with polar co-ordinates of the site; actually, as the case may be, the radiation pencil beam should effect a step-by-step sampling of the site, the beam being fixed for the duration ΔTM, whereas this sampling is continuous. On the other hand, the polar co-ordinate modulus of a pixel of the site is equal to D, this distance D being associated to the distance d by the equation:

$$D = \overline{d^2 - h^2}$$

wherein h is the height of the sensor relative to the ground. The result obtained thus generates slightly disturbed echo signals compared to theoretical results and, for a given fixed distance step Δd, the distance step ΔD is variable to such an extent that it slightly decreases when the distance d increases along the strip. However, these two inaccuracies do not affect the topology of the site to be analysed and they can be corrected, at least to the first order, in the electronic processor 7, by digital processes within the skill of the average computer expert. Other inaccuracies and deformations of the radio map are added to the preceding ones, when the sensor is carried by a mobile craft, and specifically due to the Doppler effect, result from the yawing and rolling motion of the carrying craft.

When proceeding with the spectral analysis of the signal $F_b$, for each position of the radiation pencil beam, the information corresponding to one strip of the map can thus be extracted. In order to attain a good homogeneity in the distribution of the pixels (or squares) of the map to be established, one preferably chooses sequences SU all comprising the same number of n samples, for example n=256. By performing a Fast Fourrier Transform FFT of these 256 samples, and at the rate of one pixel per sample pair, one obtains after the FFR 128 lines with a spacing of 975 GHz. Each line can be translated by a frequency-division digital sample of which the order out of the 128 is representative of the distance of a ground structure substantially rectangular to the radial and of which the amplitude is representative of the Surface Equivalent Radar (SER) of the considered structure. This amplitude is proportional to SER. For 4000 time-division samples per sawtooth of a duration $T_M$ and a scan angle varying between +15° and −15° one thus obtains a map of 15 strips the pitch between two adjacent strips being equal to 2° is substantially equal to the vertical width $\theta d$ of the pencil beam.

The electronic processor 7 represented in FIG. 4 comprises a memory for time-division samples 28 which is connected to the bus 25, and through a bus 29, to a group of special signal processors 31, which effect the spectral analysis of the beat signal and, possibly, picture processes. The group of processors 31 is connected to a memory 33 for frequency-division samples of the radio map by a bidirectional bus 32. The bidirectional bus 32 itself is connected by a bidirectional bus 34 to a non-specialized management processor 35 which is to manage the behavior of the combination of the sensor 1 and the computation of specific parameters. The management processor 35 is connected by a bus 36 to a control interface 37 which generates the signals SE, AE and CG and comprises an output bus 38. The group of processors 31 is, for example, constituted by three processors of the PSM type derived from the integrated signal processor ISP jointly developed by the French companies TRT and EFCIS. These processors are of CMOS technology and have a cycle time on the order of 100 nsec. A processor of the 68000 type can be used for the management processor 35.

The whole process of producing the map has now been described on the basis of a specific digital example.

At the command from the processor 35, which command can be given automatically or manually, an order to initiate transmission is transmitted via the bus 36 and interface 37 in the form of a logic signal SE to the slope generator 11 which supplies, at an instant $t_1$, a voltage signal to the VCO 13 apt to cause at its output a radio signal of the frequency $F_M + \Delta F/2$, (compare FIGS. 4 and 6). The transmitted radio signal is linearly frequency-modulated from an instant $t_1$ according to a decreasing frequency, at 300 MHz, whereas the mean frequency $F_M$ of the negative-slope sawtooth is 15 GHz. The duration of the modulation is fixed at TM=40 msec. The end of the transmission of the sawtooth, actuated at the instant $t_2$ by the logic command signal to stop the transmission AE, which is supplied by the interface 37 to the amplifier 14, can be obtained by a monostable action from the management processor 35, for example, by counting the time so that: $t_2 = t_1 + 40$ msec. This 300 MHz frequency swing causes a horizontal pencil beam scanning of 30°. The scanning band of the considered beat signal, selected by the band-pass filters 19 and 21 is, for example, comprised between 25 kHz and 125 kHz, corresponding with a distance range from $d_{mini} = 250$ m to $d_{maxi} = 2000$ m. It should be noted in this respect that the FM-CW radar distance measuring system is insensitive to incidence variations in a vertical plane of the support of the sensor, that is to say insensitive to the pitching motion, provided that the zone on the ground to be explored remains completely inside the radar pencil beam. The site angle of the pencil beam, for example equal to 23°, is computed so that the pitching angle of the support, for example between 0° and 7°, is taken into account. In 22, FIG. 4, the beat signal is sampled at a rate $T_s$ of 250 kHz, which means a sample period of 4 $\mu$sec and in the bus 25 encoded in 12 parallel bits, which provides an encoding dynamic of approximately 72 dB. The total number of q samples to be processed for forming a map is in this digital example equal to 10,000. The samples are tapped and processed by the spectral analysis processor 31 in sequential groups of n samples, for example n=256 sequentially chosen samples, which allows of producing, for each group, a strip picture. The energy integration time is approximately 1 msec for each pixel or square of the map. This has the following consequencies:

The deviation in horizontal position of the radar beam during the measuring operation is approximately equal to 0.75°, which is on the order of a quarter of the horizontal width of the scanning pencil beam. Thus, it is readily understood that this is the same strip of the terrain which forms the object of the scanning on a strip of the picture.

The spectral resolution of the frequency-division scanning is on the order of 975 Hz ($975 = 10^6/256 \times 4$).

Basically, the definition obtained in the radio map is sufficiently high so that a Hamming or Cosine-type weighting aperture need no longer be used for the signal which is subjected to the FFT algorithm in the processor 31. Actually, the secondary lobes of a spectral analysis applied to a signal observed in a rectangular aperture, as is the case here, are situated around 13 dB below the main lobe. These secondary lobes could only be disturbing if one tried to show two targets near one another whose echoes are very different, that is to say a difference exceeding 13 dB. Now, the mapping of alandscape generally does not require such contrasts. The absence of a weighting aperture does not cause an enlargement of the main lobe of the elementary line emanating from the FFT, nor a loss of amplitude, which would be expressed by a diminishing of the processing gain.

Figure 8A:
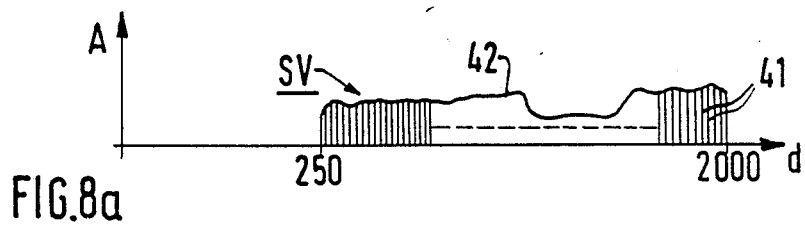
FIG. 8a is a graphic representation of a sequence SV of frequency-division samples, FIG. 8b diagrammatically shows the radio map to be established.

Each group of 256 time-division samples separated by $T_s = 4$ $\mu$sec is expressed, after a FFT operation, on the bus 32, in the form of a sequence SV of $n/2 = 128$ frequency-division samples which is 128 lines which have a spacing of 975 Hz. Thus, the energy contained in the beat signal from 25 to 125 kHz is scanned with a step of 975 Hz corresponding to a distance step d equal to 19.5 m, derived from the formula (3). In FIG. 8a is represented a sequence SV of 128 frequency-division samples 41 stored in the memory for frequency-division samples 33 (FIG. 4) as well as their envelope 42, for a given strip, whereas this sequence is derived from a sequence SU or group of 256 time-division samples. Along the x-axis is plotted the distance d in meters and along the y-axis the energy or amplitude A of each line. The samples are arranged in the memory 33 in the same order as represented in FIG. 8a. The sequences SU are sequentially processed in the chronological order of arrival of the time-division samples and the resulting sequences SV are arranged in the same order in the memory 33. The memory for time-division samples contains p adjacent sequences SU during the interval $T_M$ so that the following equation is obtained pn=q, and the order number i (i varying from 1 to p) of each sequence SU constitutes the address of the strip formed by the sequence SV derived from each considered sequence SU. Thus, in a simple manner, a bi-uniqueness is obtained between the set of addresses of the frequency-division samples 41 and the set of the polar co-ordinates of the pixels of the map. Each address comprises two vectors, one of which, represents the angular coordinate $\theta$ of the pixel or square, corresponds with the number of the order of i (i varying from 1 to p) of a sequence SV and the other vector, representative of the radial coordinate $\rho$ of the pixel or square, corresponds with the number of the order of j (j varying from 1 to n/2) of a sample in the considered sequence SV. Each pixel is representative of a square substantially in the form of a rectangle on the ground, the side of the rectangle in the radial direction being approximately equal to 20 m and the side in the transversal direction approximately equal to: $13 \times 10^{-3}$d.

Figure 8B:
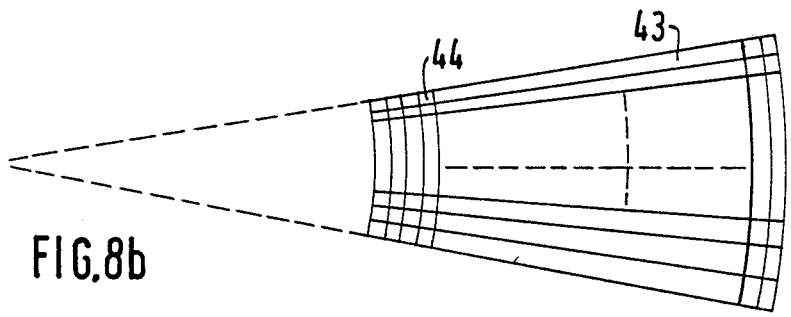

The obtained configuration or the map, represented in FIG. 8b, comprises 40 strips, separated by an angular step of 0.75°, each strip comprising approximately 130 squares. As will be noticed hereinafter it may turn out to be necessary to reduce the dimensions of the map for eliminating sections subjected to too large distortions as a result of stray movements produced by the support of the sensor when the latter is on board a mobile craft. It should be noted that these sections to be suppressed relate to the periphery of the configuration of FIG. 8b rather than to its centre.

We have seen hereinbefore that the internal clocks of the system on their own enable correct addressing which is representative of the pixels of the map. This is true, for a correct development of the scan angle $\alpha_d$ to be assigned to a strip having a given sequence number, provided that there is first a standardization between the frequency swing $\Delta F$ and the variation of the scan angle $\alpha_d$ which results therefrom. Actually, for the same value of TM and two different values $\Delta F$ and $\Delta F'$, but with the same central frequency FM, the variations of the angle $\alpha_d$, symmetrical relative to the axis $\Delta$, have different amplitudes, which fact is not taken into account for the internal addressing in the electronic processor. An addressing of the strips in the memory 33, which supplies a correct indication of the scan angle $\alpha_d$ of each strip of the map, is obtained by tapping and sampling the output signal SG of the generator 11. In the described example this voltage signal is, with a very good approximation, directly proportional to the transmitted frequency and thus to the scan angle $\alpha_d$ of the beam axis as represented in FIG. 6. If the frequency modulation is not absolutely linear there is likewise a defined law of correspondence that is foreseeable between the voltage and the beam axis. A sample of the signal SG for each sequence SU, say n samples, may suffice, which shows a sample rate of the signal SG equal to $T_S/p$. It may turn out to be necessary to shift the sequence SU, in order to make corrections, with respect to the succession of the sequences SU indicated hereinbefore: for example, it is possible to choose sequences SU' having a number of n' samples exceeding or falling short of the nominal value n chosen at the outset, which augments or diminishes by a same amount the number of squares in the radial direction. The address of each radial in the memory 33 then results from interpolation of the n samples of the elevation angles, whereas the computation is effected by the processor 35. The radial addresses and those of the pixels in the strips are contained in an address memory incorporated in the management processor 35.

The pixels of the radio map in the form of digital samples in the memory 33 can be extracted therefrom by the processor 35, according to the addressing described hereinbefore and supplied to the bus 38, for example to the display means on a television screen or cathode ray tube (not shown). It should be noted that the processing of the time-division samples is effected with a slight shift after the interval TM, the processing speed being compatible with the detection speed. This enables the transmission sawtooth periods to be contiguous, provided that the capacity of the memories 28 and 33 is chosen sufficiently large to use the sawtooth samples relating to one sawtooth while the samples of the next sawtooth are stored in memory 28. When the support 3 of the sensor is fixed to the ground or to a fixed building or again to a mobile craft whose speed and stray yawing and rolling movements are slow, the sensor described hereinbefore is suitable, without the need for corrections or masking of specific sections of the map. It is the same whether the carrying craft is an aircraft having a gyrostabilized platform or a stabilized platform controlled by an inertia unit and whether the latter constitutes the support of the sensor, a gyrostabilized platform being obtained by mounting a group of gyroscopes onto the platform. The support 3 of the sensor can also be found to be rigidly attached to the aircraft; if, in the latter case, the yawing and rolling movements are fast, for example, on the order of 20°/s for the yawing angle around a vertical axis and on the order of 50°/s for the rolling angle around the axis $\Delta$, one either has to settle for a deformed map or disregard certain strips, the strips affected most by the deformation being those which result from the pixels sampled last during the sawtooth of the transmitted signal.

At this stage, embodiments of the sensor according to the invention will be described allowing of eliminating yawing movements of the aircraft, in which case the support of the sensor is rigidly attached to the aircraft, the latter comprising an inertia unit. On the basis of a yawing angle varying by 20°/s, during the 40 msec which it takes the integration of the radar energy to form the map, the aircraft and consequently the aerial 2 of the sensor which is rigidly attached thereto, has yawed through a maximum angle of: $40 \cdot 10^{-3} \times 20 = 0.8°$. Depending on whether the rotation of the aircraft is in the same direction or in the opposite direction of the pencil beam deflection, the scanned section on the ground will be 30.8° or 29.2°. The yawing motion thus causes a spacing or a bringing together of two successive strips of the map to a maximum of $0.8/40 = 0.02°$, which is for an angular step between the strips of 0.75°, a variation of approximately 2.7% ($0.8/30 = 0.02/0.75 = 2.7\%$). For effecting this calculation it is assumed that the angular velocity of the yawing motion remains constant during these 40 msec which is the duration of the sawtooth, which is a very good approximation of the real velocity.

In order to compensate for the effect of yawing, it is thus sufficient to reduce, for a yawing movement running in the same direction as the radar beam, or increase respectively, for movements running in the opposite direction, the number of n samples of each sequence SU. This brings us back to the same conclusion that the digital processing means, in this case the management processor 35, compute the number of n samples of each sequence SU so as to make it proportional to the value: $\alpha_{dmax} - \theta_1$, wherein $\theta_1$ is the value of the yawing angle counted as an algebraic value for the duration TM, counting $\theta_1$ positive when the yawing angle occurs in the same direction as the scanning of the radiation pencil beam and negative in the opposite case. Starting from a nominal sequence of 256 samples, the correction of the yawing movement taken as an example in the preceding paragraph achieves, when made of the sequences SU' that:

$n' = 256 \times 1.027 = 263$ or $n' = 256 \times 0.973 = 249.$

For this purpose, the value $\theta_1$ of the yawing angle during the interval $T_M$ is supplied in a digital form by the inertia unit to the processor 35 which performs the required calculations. This mode of operation brings us back, according to another anti-yawing embodiment of the sensor, to subtracting from the elevation angle $\alpha_{di}$ of the radiation pencil beam, proportional to the instant $t_i$ that marks the beginning of each sequence SU, the value counted as the algebraic value $\theta_{1i}$ of the yawing angle indicated by the inertia unit on the basis of instant $t_1$, which transforms a sequence SU into a sequence SU' as indicated hereinbefore, whereas the sequence SU' is then transformed by FFT into a sequence SV' which has for its radial address the value: $\alpha_{di} - \theta 1_i$.

The directional aerial 2 is, for example, the one described in European Patent Application 0 110 479. The latter aerial is a planar slotted aerial utilizing printed circuit technology, which operates at a nominal frequency of the order of 10 GHz, procures a linear deviation of the radiation pencil beam of the order of 60° and its main dimensions are those of a rectangle of approximately 20 cm in length and 2 cm in width. As the radiation diagram has the form of a conical half nappe around the main axis of the aerial, only the central part of the beam, near the meridian plane of the aerial can be assimilated to a plane and can be used as the radar beam in the pencil beam 4 of FIG. 2. One wishes to obtain a relatively fast horizontal scanning of the radar beam, which can be obtained by shifting in a classical dispersive line, described in the book referenced hereinbefore; Radar Handbook by Skolnik, Chapter 13. Hereinbelow will be described, with reference to FIGS. 9, 10 and 11, an aerial operating at 15 GHz specially arranged for the sensor according to the invention.

Figure 9:
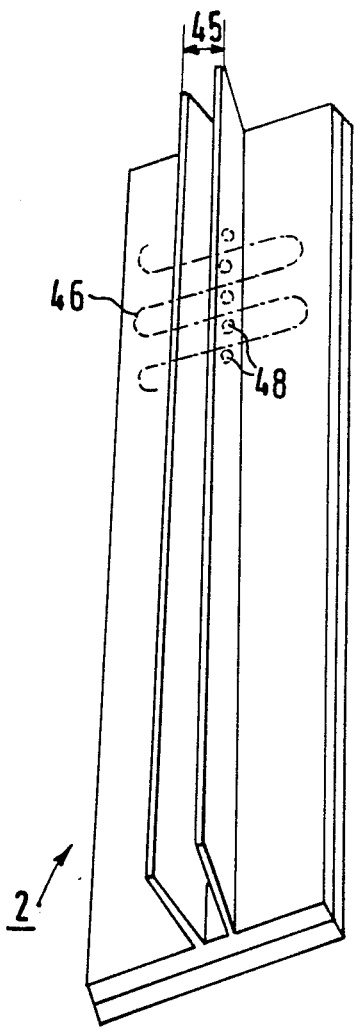
FIG. 9 is a perspective view of an embodiment of an aerial which is suitable for use in the sensor according to the invention.

The site diagram already described with reference to FIG. 2 is obtained by placing after the excitation a horn in the form of a dihedron having a 50 mm aperture, indicated by the double arrow 45, FIG. 9, ensuring a diagram of approximately 30° at half the power, with a $-12.5°$ pointing angle of the sensor axis $\Delta$. The choice of the dimensions of the waveguide 46, used for the radiation and in this case folded is the following: we have seen that an angular margin ranges from $+15°$ to $-15°$ when the frequency varies by 300 MHz for a central frequency of 15 GHz. To avoid secondary lobes, due to the effect of the radiating sources network, the spacing 47 between two sources 48 should be less than 14.6 mm, whereas the sources are aligned. To avoid the orthogonal propagation in the guide, the height of the guide should be less than 9.9 mm. For example, a height 49 of 8.3 mm is chosen, which enables little loss at a wall thickness 51 of 3 mm, which results in a spacing between two radiating sources 48 of 11.3 mm. The phase shift, however, is more rapid because the guide is nearer to the cut-off frequency. The losses, however, are also greater because the system is operating near the cut-off frequency. Furthermore, the phase shift is to be equal to an odd number of half wavelengths between two successive sources. The last three indicated constraints lead to an internal waveguide width LI of 11.47 mm for an overall height of approximately 150 mm. The aerial can be realised of a machined light alloy; it comprises, for example, 29 independent sources with a spacing of 11.3 mm, which is approximately 316 mm between the axes of the first and the last source. The distance between two successive sources along the waveguide is 14.3 mm and the loss in the waveguide is approximately 0.79 dB per linear meter. In order to have as narrow a radiation diagram as possible, all the sources radiate the same energy. The aerial angle $\theta_d$ is equal to 2.55° at half the power level. The geometric gain of the aerial is approximately 29.5 dB. The gain proper, taking into account a loss of 1.70 dB in the structure and 0.7 dB in a radome, if any, is approximately 27 dB. The aerial for scanning in elevation by a transmitted frequency swing can also be constituted by a dispersive line of printed circuit technology on a substrate, which allows of obtaining higher operating frequencies, if necessary.

The digital processing, of the samples of the signal $F_b$, as a result of its velocity and adaptivity, facilitates making corrections in the map when the latter is affected by deformations due to stray displacements of the sensor during the measuring period TM, like the Doppler effect or the roll effect. If one knows the instantaneous velocity or the roll angle of the sensor one can perform the necessary computations and influence either the time-division sample sequences of the signal $F_b$ or the resulting frequency-division samples and their addressing with respect to the corrections of the map, these computations, in general, being within the scope of the invention. For these corrections it may happen that the time-division sample sequences selected for a Fast Fourrier Transform need not necessarily be adjacent nor comprise the same number of samples, and specific ranges of pixels are retained in the resulting frequency-division sample sequences, the other pixels being eliminated as different. In addition, a reduncancy results from the fact that the elevation angle of the aerial generally exceeds the angular difference between adjacent radials of the map. This redundancy can be utilized by selecting interleaved time-division sample sequences and realising a correlation with the obtained resulting frequency-division sample sequences; these digital operations, which are known per se, also remain within the scope of the invention.

Concerning the linearity of the transmission of the frequency sawtooth by radar, it should be observed that this linearity is searched for for implementing the invention, but that it need not be absolutely obtained. Actually, it is sufficient to have a frequency law as a function of the time which is known, approximately linear, whose distortions defined a priori or measured in an internal delay line are taken into account by the stages of the air computer.

What is claimed is:

1. A frequency scanned beam steering radar apparatus for producing a polar coordinate map of a site during a period TM, said apparatus comprising:
   a. a voltage slope generator for producing a sawtooth signal having the period TM;
   b. a signal generator responsive to the sawtooth signal for producing a corresponding frequency modulated signal having a frequency swing $\Delta F$;
   c. aerial means responsive to the frequency modulated signal for transmitting toward the site a beam scanned over a predetermined angle and for receiving echoes from said site;
   d. beat signal means coupled to the signal generator and the aerial means for producing a beat signal $F_b$ having a frequency $f_b$;
   e. an analog signal processing circuit including an amplifier for amplifying the beat signal and a band pass filter for passing frequencies in said beat signal which correspond with an anticipated range of distances to the site;
   f. digitizing means for producing, during the period TM, at least q digital time division samples of the amplified and filtered beat signal;
   g. a first memory for storing the at least q time division samples produced by the digitizing means;
   h. digital processing means for converting p sequential groups SU of the time division samples, each group SU having n samples, to p corresponding groups SV of frequency division samples, the amplitude of each frequency division sample representing a pixel of the site and each group of frequency division samples SV representing a strip of said site; and i. a second memory for storing the frequency division samples at addresses corresponding to respective polar coordinates of the pixels represented by said frequency division samples.

2. A frequency scanned beam steering radar apparatus as in claim 1 where said apparatus is attached to the ground.

3. A frequency scanned beam steering radar apparatus as in claim 1 where said apparatus is supported by a stabilized platform for attachment to an aircraft.

4. A frequency scanned beam steering radar apparatus as in claim 1 where said apparatus is rigidly attached to an aircraft.

5. A frequency scanned beam steering radar apparatus as in claim 1 where pn=q and where the groups SU are stored sequentially in the first memory.

6. A frequency scanned beam steering radar apparatus as in claim 1 for use on an aircraft craft subject to yaw, characterized in that the digital processing means computes the number n such that it is proportional to the value $\alpha_{dmax} - \theta_1$, where $\alpha_{dmax}$ is a maximum scan angle of the beam and where $\theta_1$ is the value of the yaw of the aircraft during the period TM.

7. A frequency scanned beam steering radar apparatus as in claim 1 including means for providing digital samples of the sawtooth signal to the digital processing means to facilitate computation of the beginning of each of said periods TM.

8. A frequency scanned beam steering radar apparatus as in claim 1 where the aerial means comprises a dihedral shaped horn and a dispersive line including a folded waveguide having a plurality of radiating elements spaced apart by an odd number of half wavelengths of the transmitted beam, said sources being aligned for radiating into said horn.

9. A frequency scanned beam steering radar apparatus as in claim 1 where the aerial means comprises a printed circuit dispersive line disposed on a substrate.

* * * * *